United States Patent Office 3,579,503
Patented May 18, 1971

3,579,503
PYRROLO[3,2,1-jk][1,4]BENZODIAZEPINONES
Jackson B. Hester, Jr., Portage, Mich., assignor to The Upjohn Company, Kalamazoo, Mich.
No Drawing. Filed Nov. 3, 1969, Ser. No. 873,718
Int. Cl. C07d 53/06
U.S. Cl. 260—239.3     21 Claims

ABSTRACT OF THE DISCLOSURE 1,2 - dihydro - 7 - phenylpyrrolo[3,2,1-jk][1,4]benzodiazepin - 4(5H) - ones; 6,7 - dihydro - 7-phenylpyrrolo[3,2,1 - jk][1,4]benzodiazepin - 4(5H)-ones; 7-phenylpyrrolo[3,2,1 - jk][1,4]benzodiazepin-4(5H)-ones; 1,2 - dihydro - 6 - phenylpyrrolo[1,2,3-ef][1,5]benzodiazepin - 4(5H) - ones; 1,2 - dihydro-4-phenylpyrrolo [1,2,3-ef][1,5]benzodiazepin - 6(7H) - ones and 1,2,4,5-tetrahydro - 4 - phenylpyrrolo[1,2,3 - ef][1,5]benzodiazepin-6(7H)-ones, processes for preparing the same and novel intermediates prepared by said processes. The novel compounds of this invention exhibit tranquilizing and anticonvulsant activity in animals.

BRIEF SUMMARY OF THE INVENTION

This invention relates to novel 1,2-dihydro-7-phenylpyrrolo[3,2,1 - jk][1,4]benzodiazepin - 4(5H) - ones (I and I'), 6,7 - dihydro - 7 - phenylpyrrolo[3,2,1-jk][1,4] benzodiazepin - 4(5H) - ones. (II), 7-phenylpyrrolo-[3,2,1-jk][1,4]benzodiazepin - 4(5H) ones (III), 1,2-dihydro - 6 - phenylpyrrolo[1,2,3-ef][1,5]benzodiazepin-4(5H)-ones (IV), 1,2 - dihydro - 4 - phenylpyrrolo[1,2,3-ef][1,5]benzodiazepin - 6(7H) - ones (V) and 1,2,4,5-tetrahydro - 4 - phenylpyrrolo[1,2,3 - ef][1,5]benzodiazepin - 6(7H) - ones (VI), processes for preparing the same and novel intermediates prepared by said processes. The novel compounds of the invention have the formulae:

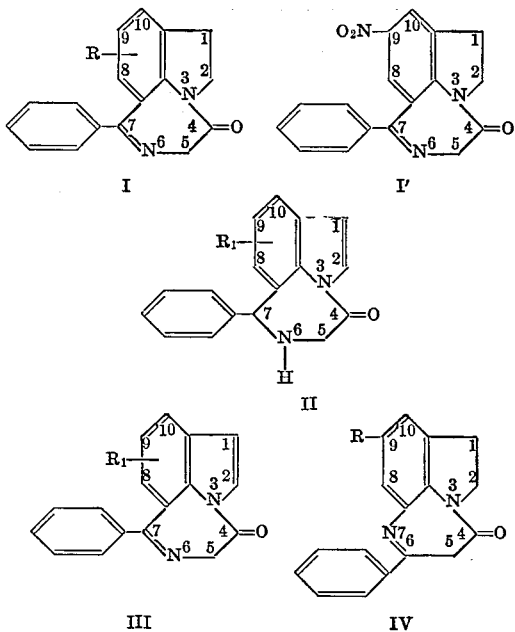

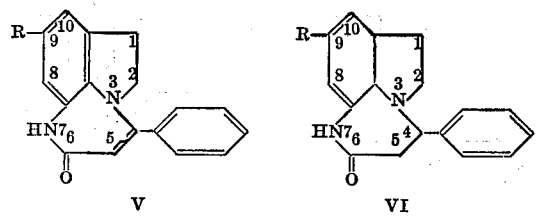

wherein R is selected from the group consisting of hydrogen, alkyl of from 1 to 3 carbon atoms, inclusive, alkoxy of from 1 to 3 carbon atoms, inclusive, bromo, chloro and fluoro; and $R_1$ is selected from the group consisting of hydrogen, alkyl of from 1 to 3 carbon atoms, inclusive, and alkoxy of from 1 to 3 carbon atoms, inclusive.

The novel intermediates of this invention have the formulae:

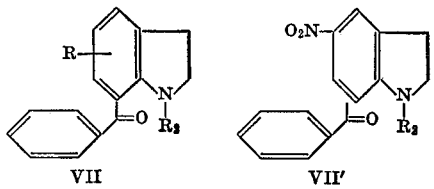

wherein R is the same as above and $R_2$ is selected from the group consisting of hydrogen, acetyl and bromoacetyl.

The term "novel compounds" and "novel intermediates" of this invention, as used throughout the specification embraces compounds represented by Formulae I, I', II, III, IV, V and VI, the acid addition salts thereof, the compounds of Formulae VII and VII' and the acid addition salts of VII and VII' wherein $R_2$ is hydrogen. The term alkyl is inclusive of methyl, ethyl, propyl and isopropyl. The term alkoxy is inclusive of methoxy, ethoxy, propoxy and isopropoxy.

The novel compounds of the invention can be prepared by processes represented by the following equations.

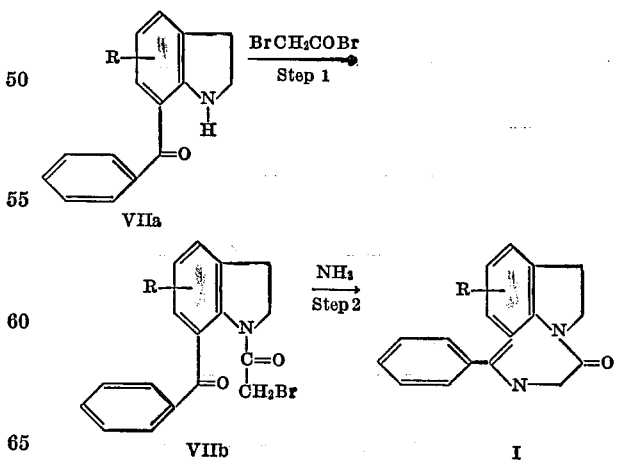

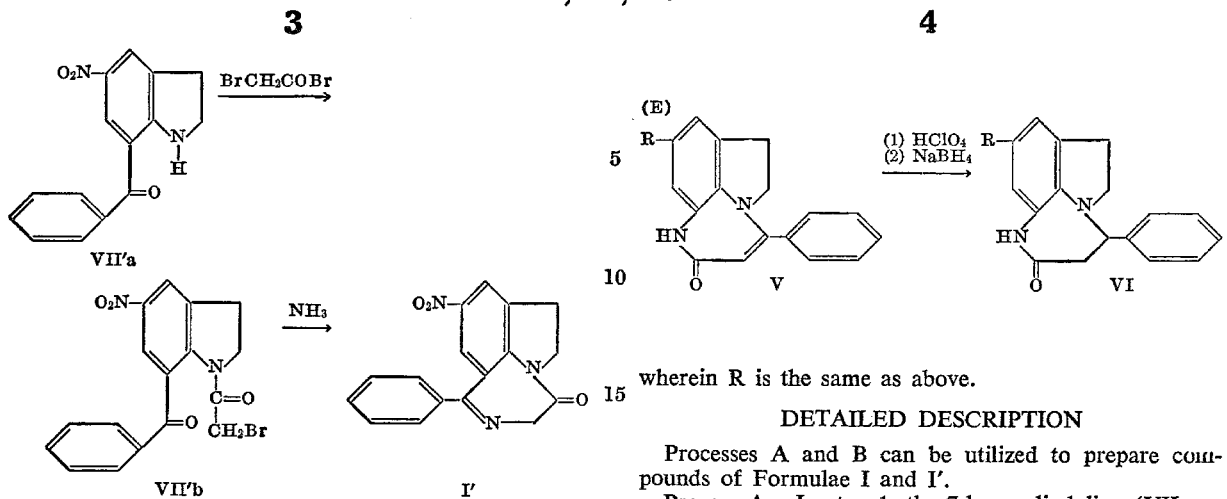

wherein R is the same as above.

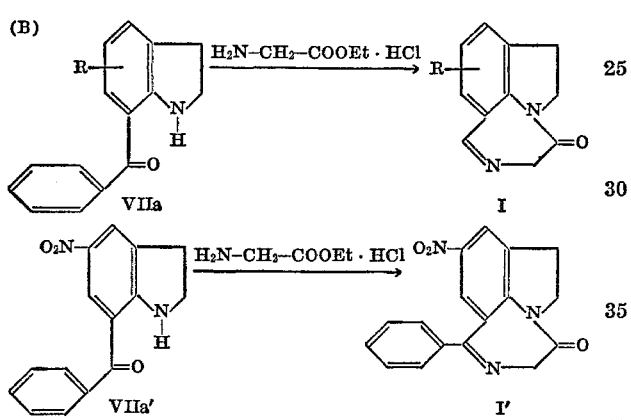

wherein R is the same as above.

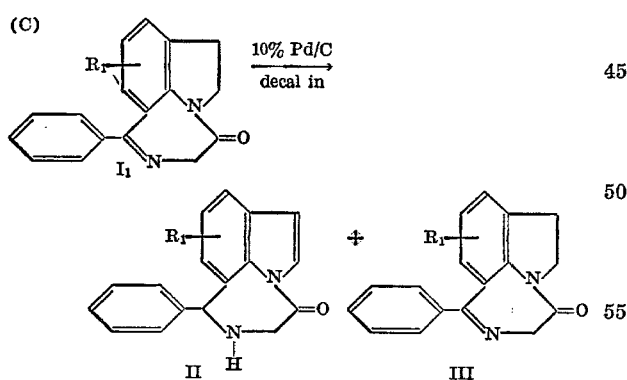

wherein R is the same as above.

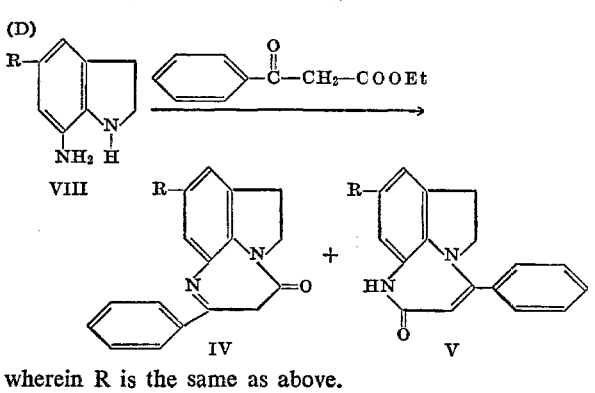

wherein R is the same as above.

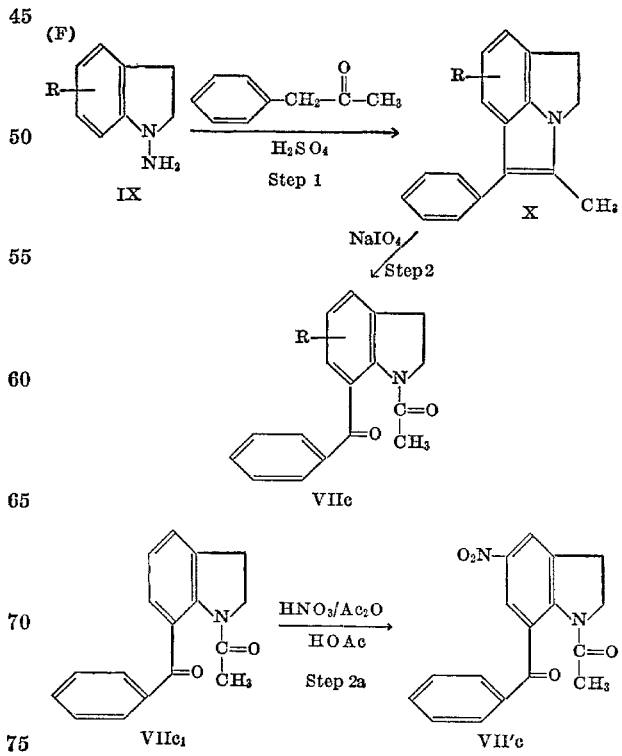

wherein R is the same as above.

DETAILED DESCRIPTION

Processes A and B can be utilized to prepare compounds of Formulae I and I'.

Process A.—In step 1, the 7-benzoylindoline (VIIa or VII'a) and bromoacetyl bromide in benzene is refluxed gently for 1–5 hours to yield a 1-(bromoacetyl)-7-benzoylindoline (VIIb or VII'b). Other solvents besides benzene that can be used include toluene and xylene. A slow stream of nitrogen is passed through the system to remove hydrogen bromide formed in the reaction. This reaction can also be carried out at 0–25° C. in ether or benzene using an acid acceptor such as pyridine or triethylamine.

In step 2, the 1-(bromoacetyl)-7-benzoylindoline (VIIb or VII'b) is dissolved in a solution of anhydrous ammonia in methanol and the solution is allowed to stand at 25° C. for 5–18 hours to yield I or I'.

Process B.—In this process a 7-benzoylindoline (VIIa or VII'a) is refluxed with ethyl glycinate hydrochloride and dry pyridine for 18–24 hours to yield I or I'.

In both methods A and B, the products can be recovered from the reaction mixture by conventional procedures such as crystallization, evaporation, distillation, chromatography and combinations thereof.

The 7-benzoylindolines (VIIa and VII'a) utilized in Processes A and B can be prepared by processes illustrated in F.

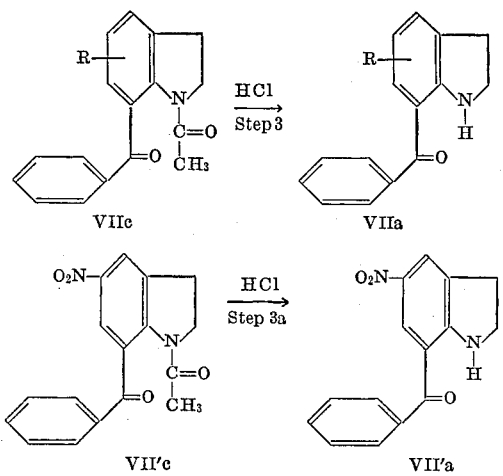

wherein R is the same as above.

The 1-aminoindolines (IX) used as starting materials in Process F can be prepared from the appropriately substituted indoline in accordance with the procedure illustrated by G.

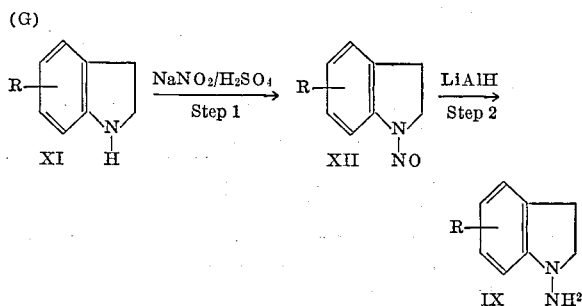

wherein R is the same as above. The details of this procedure are adequately described by Kost et al., J. Gen. Chem. 29, 3782 (1959). The indolines (XI) utilized in Process G are either readily available or they can be prepared by known methods.

Process C.—In this process a 1,2-dihydro-7-phenylpyrrolo[3,2,1-jk][1,4]benzodiazepin-4(5H)-one ($I_1$) is heated with a mixture of 10% palladium-on-carbon catalyst and Decalin at a temperature of 185–193° C. for a period of 1–3 hours to yield a mixture of the corresponding 6,7 - dihydro - 7-phenylpyrrolo[3,2,1-jk][1,4]-benzodiazepin-4(5H)-one (II) and 7-phenylpyrrolo-[3,2,1-jk][1,4]benzodiazepin-4(5H)-one (III). The compounds II and III are separated by chromatography and then individually recovered by crystallization, evaporation or other conventional recovery methods.

The starting material $I_1$ for Process C is prepared in the same manner as I (Process A or B).

Process D.—In this process a solution of ethyl benzoylacetate in xylene is added slowly to a boiling solution of the 7-aminoindoline (VIII) in xylene. During the addition and for an additional 30–60 minutes, the ethanol and water formed in the reaction are distilled from the mixture. The products formed in the reaction, 1,2-dihydro-6 - phenylpyrrolo[1,2,3-ef][1,5]benzodiazepin-4(5H)-one (IV) and 1,2 - dihydro-4-phenylpyrrolo[1,2,3-ef][1,5]-benzodiazepin-6(7H)-one (V), can be separated by virtue of their different solubility characteristics.

The starting material (VIII) wherein R is alkyl of from 1 to 3 carbon atoms, inclusive, alkoxy of from 1 to 3 carbon atoms, inclusive, bromo, chloro and fluoro can be prepared by a process illustrated by H:

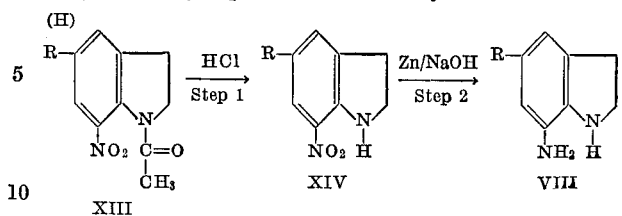

In step 1 a 1-acetyl-7-nitroindoline (XIII) is refluxed with a mixture of 6 N hydrochloric acid and ethanol for 1–8 hours to give the corresponding 7-nitroindoline (XIV).

In step 2, a stirred refluxing mixture of XIV, ethanol and 20% aqueous sodium hydroxide, is treated portionwise with zinc dust at such a rate that the reflux temperature is maintained without external heating. After the addition, the mixture is refluxed for an additional hour to yield the corresponding 7-aminoindoline (VIII).

The 1-acetyl-7-nitroindolines (XIII) utilized as starting materials (in Process H) are either readily available or can be prepared by methods well known in the art.

The compound of Formula VIII wherein R is hydrogen can be prepared by the method described by Gall et al., J. Org. Chem. 20, 1538 (1955).

Process E.—In step 1 of this process, a stirred suspension of 1,2-dihydro-4-phenylpyrrolo[1,2,3-ef][1,5]benzo-diazepin-6(7H)-one (V) in ether is treated with an excess of 70% aqueous perchloric acid and the mixture stirred for an additional 2–5 hours.

In step 2, the product from step 1 is added to a stirred mixture of sodium borohydride in ethanol. The mixture is then allowed to stand at ambient temperature for 5–18 hours. The 1,2,4,5-tetrahydro-4-phenylpyrrolo[1,2,3-ef][1,5]benzodiazepin-6(7H)-ones (VI) can be recovered from the reaction mixture by conventional procedures such as crystallization, evaporation, chromatography and combinations thereof.

The acid addition salts of the invention comprise the salts of the compounds of Formulas I, I', II, III, IV, V and VI and the salts of the compounds of Formulas VII and VII' wherein $R_2$ is hydrogen with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cyclohexanesulfamic, succinic, nicotinic, ascorbic acids and the like.

The novel compounds of this invention exhibit tranquilizing and anticonvulsant activity. Activity was evaluated by use of the following tests.

CHIMNEY TEST [Med. Exp. 4, 11 (1961)]

This test determines the ability of mice to back up and out of a vertical glass cylinder within 30 seconds. Failure of mice to back up and out within this time indicates tranquilization.

DISH TEST

Mice in Petri dishes (10 cm. diameter, 5 cm. high, partially embedded in wood shavings) climb out in a very short time, when not treated. Mice remaining in the dish for more than 3 minutes indicates tranquilization.

PEDESTAL TEST

Mouse is placed on a pedestal. The untreated mouse leaves the pedestal in less than a minute to climb back to the floor of the standard mouse box. Tranquilized mice will stay more than 1 minute.

NICOTINE ANTAGONISM TEST

Thirty minutes after mice in a group are treated with the test compound, both the treated and untreated mice are injected with 2 mg./kg. of nicotine salicylate. The untreated mice show overstimulation, i.e. (1) running convulsions followed by (2) tonic extensor fits, followed by (3) death. An effective nicotine antagonist will protect the treated mice against (2) and (3).

The results of the above tests utilizing some of the novel compounds of this invention (administered intraperitoneally) are set forth in the following table. The results are expressed in terms of the mg./kg. dosage at which the tested compounds exhibited the activity in 50% of the mice ($ED_{50}$).

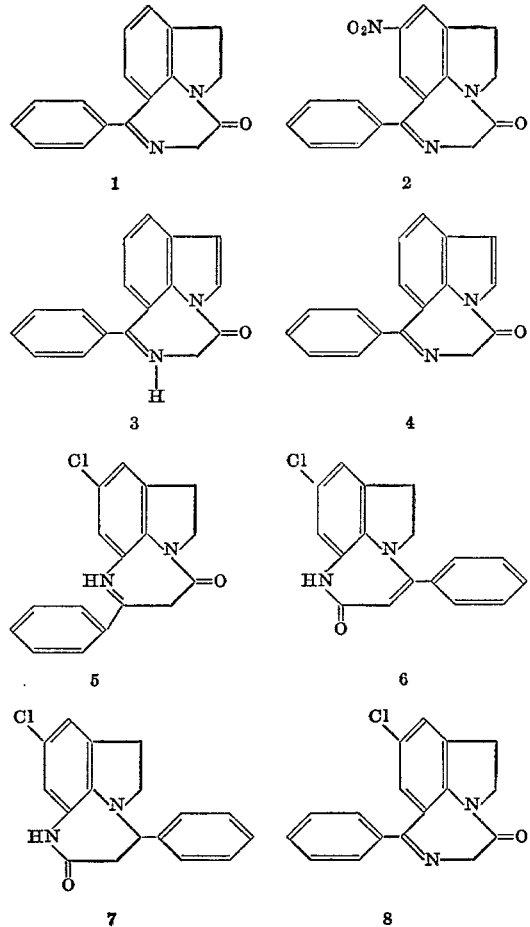

| Compound | 1 | 2 | 3 | 4 | 5 | 6 | 7 | 8 |
|---|---|---|---|---|---|---|---|---|
| Test: | | | | | | | | |
| Chimney | 20 | 56 | 159 | 159 | | 142 | 159 | 8.8 |
| Dish | | 63 | 25 | 278 | 112 | 89 | 126 | 8.8 |
| Pedestal | | 79 | 32 | | | 28 | | |
| N.A.[1]: | | | | | | | | |
| TE[2] | 18 | | >200 | 178 | 126 | 142 | | |
| D[3] | 20 | | >200 | 178 | 126 | 142 | | |

[1] N.A.=Nicotine antagonism.
[2] TE=Tonic extensor fits.
[3] D=Death.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules and the like solid dosage forms, using starch and like excipients, or dissolved in suitable solvents or vehicles for oral or parenteral administration.

Also, for mammals and birds food premixes, with starch, oatmeal, dried fishmeat, fishmeal, flour and the like can be prepared.

The novel compounds of this invention having the Formulas I, I', II, III, IV, V and VI and the Formulas VII and VII' wherein $R_2$ is hydrogen also form thiocyanic acid addition salts which, when condensed with formaldehyde, form resinous materials useful as pickling inhibitors according to U.S. Patent 2,425,320 and U.S. Patent 2,606,155. The fluosilicic acid addition salts are useful as mothproofing agents according to U.S. Patents 1,915,334 and 2,075,359.

The following examples are set forth to illustrate my invention and to enable persons skilled in the art to better understand and practice the invention and are not intended to limit the same.

PREPARATIONS (A) *1,2-dihydro-4-methyl-5-phenylpyrrolo[3,2,1-hi]indole*

A stirred mixture of 47.4 g. (0.353 mole) of 1-aminoindoline, 47.4 g. (0.353 mole) of phenylacetone, 7.05 ml. of acetic acid and 3.4 l. of benzene is refluxed under nitrogen for about 2 hours with azeotropic distillation of water. The solution is then concentrated under reduced pressure. A solution of the residue in 20% ethanolic sulfuric acid is warmed on the steam bath for about 10 minutes; a solid crystallizes from the reaction mixture during this period. The mixture is poured into ice water and stirred for about 45 minutes. The solid is collected by filtration and dried to give 48.3 g. of crude product, melting point 136–138° C. The filtrate is allowed to stand for 18 hours at room temperature. During this time additional product, 6.95 g., melting point 135.5–138° C. precipitates. Crystallization of the combined product from isopropanol gives 50.9 g. of product, melting point 138–140.5° C. Recrystallization of the product from 95% ethanol yields 1,2-dihydro-4-methyl-5-phenylpyrrolo[3,2,1-hi]indole, melting point 139–140° C.

*Analysis.*—Calcd. for $C_{17}H_{15}N$ (percent): C, 87.51; H, 6.48; N, 6.00. Found (percent): C, 87.30; H, 6.52; N, 6.00.

Using the procedure described in Preparation A, but replacing 1-aminoindoline by the appropriately substituted 1-aminoindoline is productive of the corresponding 1,2-dihydro-4-methyl - 5 - phenylpyrrolo[3,2,1-hi]indole. Representative of the indoles so obtained are:

1,2-dihydro-4,6-dimethyl-5-phenylpyrrolo[3,2,1-hi]indole
1,2-dihydro-4,7-dimethyl-5-phenylpyrrolo[3,2,1-hi]indole
1,2-dihydro-4,8-dimethyl-5-phenylpyrrolo[3,2,1-hi]indole
1,2-dihydro-8-ethyl-4-methyl-5-phenylpyrrolo[3,2,1-hi]indole
1,2-dihydro-8-propyl-4-methyl-5-phenylpyrrolo[3,2,1-hi]indole
1,2-dihydro-8-isopropyl-4-methyl-5-phenylpyrrolo[3,2,1-hi]indole
1,2-dihydro-6-methoxy-4-methyl-5-phenylpyrrolo[3,2,1-hi]indole
1,2-dihydro-7-methoxy-4-methyl-5-phenylpyrrolo[3,2,1-hi]indole
1,2-dihydro-8-methoxy-4-methyl-5-phenylpyrrolo[3,2,1-hi]indole
1,2-dihydro-8-ethoxy-4-methyl-5-phenylpyrrolo[3,2,1-hi]indole
1,2-dihydro-8-propoxy-4-methyl-5-phenylpyrrolo[3,2,1-hi]indole and
1,2-dihydro-8-isopropoxy-4-methyl-5-phenylpyrrolo[3,2,1-hi]indole.

(B) *1-acetyl-7-benzoylindoline*

A stirred mixture of 37.9 g. (0.163 mole) of 1,2-dihydro-4-methyl-5-phenylpyrrolo[3,2,1-hi]indole (Preparation A), 87.0 g. (0.406 mole) of sodium metaperiodate, 1625 ml. of dioxane and 460 ml. of water is heated at 60° C., under nitrogen, for 20 hours. It is then poured into 5 l. of ice water and the resulting mixture is extracted with chloroform. The chloroform extract is washed with water, dried over anhydrous magnesium sulfate and concentrated in vacuo. The residue is chromatographed on 2.2 kg. of silica gel with ethyl acetate; 200-ml. fractions are collected. The material eluted in fractions 35–51 is crystallized from ethyl acetate to give 10.9 g. (24.8%) of crude product, melting point 142–143° C. The product is recrystallized from ethyl acetate to give 1-acetyl-7-benzoylindoline, melting point 142.5° C.

*Analysis.*—Calcd. for $C_{17}H_{15}NO_2$ (percent): C, 76.96; H, 5.70; N, 5.28. Found (percent): C, 76.89; H, 5.76; N, 5.53.

Using the procedure described in Preparation B, but replacing 1,2-dihydro-4-methyl-5-phenylpyrrolo[3,2,1-hi]indole by the appropriately substituted 1,2-dihydro-4-methyl-5-phenylpyrrolo[3,2,1-hi]indole is productive of the correspondingly substituted 1-acetyl-7-benzoylindoline. Representative of the 1-acetyl-7-benzoylindolines so obtained are:

1-acetyl-4-methyl-7-benzoylindoline
1-acetyl-5-methyl-7-benzoylindoline
1-acetyl-6-methyl-7-benzoylindoline
1-acetyl-4-ethyl-7-benzoylindoline
1-acetyl-4-propyl-7-benzoylindoline
1-acetyl-4-isopropyl-7-benzoylindoline
1-acetyl-4-methoxy-7-benzoylindoline
1-acetyl-5-methoxy-7-benzoylindoline
1-acetyl-6-methoxy-7-benzoylindoline
1-acetyl-4-ethoxy-7-benzoylindoline
1-acetyl-4-propoxy-7-benzoylindoline and
1-acetyl-4-isopropoxy-7-benzoylindoline.

(C) *7-benzoylindoline*

A stirred mixture of 12.6 g. (0.0467 mole) of 1-acetyl-7-benzoylindoline, 380 ml. of 6 N hydrochloric acid and 760 ml. of absolute ethanol is refluxed under nitrogen for 5 hours and allowed to stand at room temperature for 18 hours. It is then poured into 4 l. of ice water and the resulting mixture is made ammoniacal. The crystalline product is collected by filtration, washed with water, dried and recrystallized from ethyl acetate-Skellysolve B hexanes to give 9.79 g. (84.5%) of 7-benzoylindoline, melting point 124–125° C.

*Analysis.*—Calcd. for $C_{15}H_{13}NO$ (percent): C, 80.69; H, 5.87; N, 6.27. Found (percent): C, 80.60; H, 5.93; N, 6.47.

Using the procedure described in Preparation C, but replacing 1-acetyl-7-benzoylindoline with the appropriately substituted 1-acetyl-7-benzoylindoline is productive of the correspondingly substituted 7-benzoylindoline. Representative of the 7-benzoylindolines so obtained are:

4-methyl-7-benzoylindoline
5-methyl-7-benzoylindoline
6-methyl-7-benzoylindoline
4-ethyl-7-benzoylindoline
4-propyl-7-benzoylindoline
4-isopropyl-7-benzoylindoline
5-methoxy-7-benzoylindoline
4-ethoxy-7-benzoylindoline
4-propoxy-7-benzoylindoline and
4-isopropoxy-7-benzoylindoline.

(D) *1-(bromoacetyl)-7-benzoylindoline*

A stirred solution of 2.23 g. (0.01 mole) of 7-benzoylindoline (Preparation C) and 0.806 ml. (0.01 mole) of pyridine in 200 ml. of ether is treated, under nitrogen, with a solution of 2.24 g. (0.012 mole) of bromoacetyl bromide in a little ether. The resulting mixture is stirred at room temperature for 2.5 hours and poured into water. The solid product is collected by filtration, washed with water, dried in vacuo, and crystallized from ethyl acetate to give 2.43 g. of crude products. The ether layer is washed with water, dried over anhydrous potassium carbonate and concentrated. Crystallization of the residue from ethyl acetate gives 0.283 g. of additional crude product. The products are combined and recrystallized from ethyl acetate to yield 1-(bromoacetyl)-7-benzoylindoline, melting point 132.5–133° C.

*Analysis.*—Calcd. for $C_{17}H_{14}BBBrNO_2$ (percent): C, 59.32; H, 4.10; N, 4.07; Br, 23.22. Found (percent): C, 59.71; H, 3.95; N, 4.17; Br, 23.17.

Using the procedure described in Preparation D, but replacing 7-benzoylindoline by the appropriately substituted 7-benzoylindoline is productive of the correspondingly substituted 1-(bromoacetyl)-7-benzoylindoline. Representative of the 1-(bromoacetyl)-7-benzoylindolines so obtained are:

1-bromoacetyl)-4-methyl-7-benzoylindoline
1-(bromoacetyl)-5-methyl-7-benzoylindoline
1-(bromoacetyl)-6-methyl-7-benzoylindoline
1-(bromoacetyl)-4-ethyl-7-benzoylindoline
1-(bromoacetyl)-4-propyl-7-benzoylindoline
1-(bromoacetyl)-4-isopropyl-7-benzoylindoline
1-(bromoacetyl)-5-methoxy-7-benzoylindoline
1-(bromoacetyl)-4-ethoxy-7-benzoylindoline
1-(bromoacetyl)-4-propoxy-7-benzoylindoline and
1-(bromoacetyl)-4-isopropoxy-7-benzoylindoline.

(E) *7-chloro-1,2-dihydro-4-methyl-5-phenyl-pyrrolo[3,2,1-hi]indole*

A stirred mixture of 45.8 g. (0.297 mole) of 1-amino-5-chloroindoline, 39.8 g. (0.297 mole) of phenylacetone, 5.91 ml. of glacial acetic acid and 760 ml. of benzene is refluxed under nitrogen for 2.5 hours, with azeotropic distillation of water. The resulting solution is cooled and concentrated under reduced pressure. A solution of 114.2 g. of concentrated sulfuric acid in 592 ml. of absolute ethanol is added to the residue, and the resulting mixture is heated on the steam bath for 10 minutes, cooled and poured into ice water. The product, which precipitates during the reaction, is collected by filtration, washed with water, dried and crystallized from acetone to give 38.0 g. (47.8%) of product, melting point 205–206.5° C. The product is recrystallized from methyl ethyl ketone to give 7-chloro-1,2-dihydro-4-methyl-5-phenylpyrrolo[3,2,1-hi]indole, melting point 205.5–206.5° C.

*Analysis.*—Calcd. for $C_{17}H_{14}ClN$ (percent): C, 76.25; H, 5.27; Cl, 13.24; N, 5.23. Found (percent): C, 75.79; H, 5.23; Cl, 13.38; N, 4.99.

Using the procedure described in Preparation E, but replacing 1-amino-5-chloroindoline with the appropriately substituted 1-amino-haloindoline is productive of the corresponding 1,2-dihydro-halo-4-methyl-5-phenylpyrrolo[3,2,1-hi]indole. Representative of the indoles so obtained are:

6-chloro-1,2-dihydro-
8-chloro-1,2-dihydro-
6-bromo-1,2-dihydro-
7-bromo-1,2-dihydro-
8-bromo-1,2-dihydro-
1,2-dihydro-6-fluoro-
1,2-dihydro-7-fluoro- and
1,2-dihydro-8-fluoro-4-methyl-5-phenylpyrrolo[3,2,1-hi]indole.

(F) *1-acetyl-7-benzoyl-5-chloroindoline*

A stirred solution of 38.0 g. (0.0142 mole) of 7-chloro-1,2-dihydro-4-methyl-5-phenylpyrrolo[3,2,1-hi]indole (Preparation E) in 1800 ml. of hot dioxane (70–75° C.) is treated, under nitrogen, during 1.5 hours with a solution of 79.0 g. of sodium metaperiodate in 375 ml. of warm water. The resulting mixture is kept at about 70° C. for 20 hours, cooled, poured into ice water and extracted several times with chloroform. The combined extracts are washed with water, dried over anhydrous magnesium sulfate and concentrated under reduced pressure. Crystallization of the residue from acetone gives 9.4 g. of starting material. The mother liquor is concentrated and chromatographed on 2 kg. of silica gel with ethyl acetate; 150-ml. fractions are collected. Fractions 17–25 are found to contain 7-benzoyl-5-chloroindoline. Fractions 38–57 are crystallized from ethyl acetate to give 11.1 g. of product, which is recrystallized from ethyl acetate to yield 1-acetyl-7-benzoyl-5-chloroindoline, melting point 163–164.5° C.

*Analysis.*—Calcd. for $C_{17}H_{14}ClNO_2$ (percent): C, 68.11; H, 4.71; Cl, 11.83; N, 4.67. Found (percent): C, 68.30; H, 4.87; Cl, 11.91; N, 4.66.

Using the procedure described in Preparation F, but replacing 7 - chloro-1,2-dihydro-4-methyl-5-phenylpyrrolo [3,2,1-hi]indole with the appropriately substituted 1,2-dihydro-4-methyl-5-phenylpyrrolo[3,2,1-hi]indole is productive of the corresponding 1-acetyl-7-benzoylindoline. Representative of the 1-acetyl-7-benzoylindolines so obtained are:

1-acetyl-7-benzoyl-4-chloroindoline
1-acetyl-7-benzoyl-6-chloroindoline
1-acetyl-7-benzoyl-4-bromoindoline
1-acetyl-7-benzoyl-5-bromoindoline
1-acetyl-7-benzoyl-6-bromoindoline
1-acetyl-7-benzoyl-4-fluoroindoline
1-acetyl-7-benzoyl-5-fluoroindoline and
1-acetyl-7-benzoyl-6-fluoroindoline.

(G) *7-benzoyl-5-chloroindoline*

A stirred mixture of 1.95 g. (0.00652 mole) of 1-acetyl-7-benzoyl-5-chloroindoline (Preparation F), 33.3 ml. of absolute ethanol and 16.7 ml. of 6 N hydrochloric acid is refluxed under nitrogen for 4 hours, cooled and poured into ice water. The resulting mixture is made alkaline with 50% aqueous sodium hydroxide. The yellow, crystalline product is collected by filtration, washed with water and dried to give 1.65 g. (98.6%) of crude product. The product is recrystallized from ethyl acetate-Skellysolve B hexanes to yield 7-benzoyl-5-chloroindoline, melting point 123–123.5° C.

*Analysis.*—Calcd. for $C_{15}H_{12}ClNO$ (percent): C, 69.90; H, 4.70; Cl, 13.76; N, 5.44. Found (percent): C, 69.59; H, 4.82; Cl, 13.83; N, 5.83.

Using the procedure described in Preparation G, but replacing 1-acetyl-7-benzoyl-5-chloroindoline by the appropriately substituted 1-acetyl-7-benzoylindoline is productive of the correspondingly substituted 7-benzoylindoline. Representative of the 7-benzoylindolines so obtained are:

7-benzoyl-4-chloroindoline
7-benzoyl-6-chloroindoline
7-benzoyl-4-bromoindoline
7-benzoyl-5-bromoindoline
7-benzoyl-6-bromoindoline
7-benzoyl-4-fluoroindoline
7-benzoyl-5-fluoroindoline and
7-benzoyl-6-fluoroindoline.

(H) *7-benzoyl-1-(bromoacetyl)-5-chloroindoline*

A stirred mixture of 1.50 g. (5.83 millimoles) of 7-benzoyl-5-chloroindoline (Preparation G), 50 ml. of benzene and 2.35 g. (11.7 millimoles) of bromoacetyl bromide is refluxed for 45 minutes with a slow stream of nitrogen flowing through the system to flush out the hydrogen bromide formed. The mixture is cooled in an ice bath and diluted with 50 ml. of Skellysolve B hexanes. The crystalline material is collected by filtration, washed with Skellysolve B hexanes and recrystallized from ethyl acetate-Skellysolve B hexanes to give 1.73 g. (78.3%) of product. Additional product, 0.269 g., is obtained by concentrating the benzene-Skellysolve B hexanes filtrate and crystallizing the residue from ethyl acetate-Skellysolve B hexanes. The two crops are combined and recrystallized from ethyl acetate-Skellysolve B hexanes to yield 7-benzoyl-1-(bromoacetyl)-5-chloroindoline, melting point 165.5–166.5° C.

*Analysis.*—Calcd. for $C_{17}H_{13}BrClNO_2$ (percent): C, 53.92; H, 3.46; Br, 21.11; Cl, 9.36; N, 3.70. Found (percent): C, 54.17; H, 3.71; Br, 21.04; Cl, 9.43; N, 3.69.

Using the procedure described in Preparation H, but replacing 7-benzoyl-5-chloroindoline with the appropriate 7-benzoyl-haloindoline is productive of the corresponding 7-benzoyl-1-(bromoacetyl) - haloindoline. Representative of the haloindolines so obtained are:

7-benzoyl-1-(bromoacetyl)-4-chloroindoline
7-benzoyl-1-(bromoacetyl)-6-chloroindoline
7-benzoyl-1-(bromoacetyl)-4-bromoindoline
7-benzoyl-1-(bromoacetyl)-5-bromoindoline
7-benzoyl-1-(bromoacetyl)-6-bromoindoline
7-benzoyl-1-(bromoacetyl)-4-fluoroindoline
7-benzoyl-1-(bromoacetyl)-5-fluoroindoline and
7-benzoyl-1-(bromoacetyl)-6-fluoroindoline.

(I) *1-acetyl-7-benzoyl-5-nitroindoline*

A stirred mixture of 21.8 g. (0.0823 mole) of 1-acetyl-7-benzoylindoline (Preparation B), 82.3 ml. of acetic anhydride and 41 ml. of acetic acid is cooled to 10° C. and treated during 15 minutes with 8.64 g. (0.123 mole) of 90% nitric acid. The temperature is kept below 13° C. during the addition. The reaction mixture is allowed to warm slowly to ambient temperature during 4.5 hours and is then poured into ice water. This mixture is stirred for 30 minutes, and the solid is collected by filtration, washed with water and dried in vacuo. Crystallization of this solid from ethanol-methylene chloride gives 21.5 g. (84.2%) of crude product. Recrystallization of the crude product from ethanol-methylene chloride gives 1-acetyl-7-benzoyl-5-nitroindoline, melting point 200–201° C.

*Analysis.*—Calcd. for $C_{17}H_{14}N_2O_4$ (percent): C, 65.80; H, 4.55; N, 9.03. Found (percent): C, 65.73; H, 4.60; N, 8.81.

(J) *7-benzoyl-5-nitroindoline*

A stirred mixture of 9.30 g. (0.030 mole) of 1-acetyl-7-benzoyl-5-nitroindoline (Preparation I), 100 ml. of 6 N hydrochloric acid and 300 ml. of ethanol is refluxed under nitrogen for 1 hour. As the reaction proceeds the reactants slowly go into solution and a solid precipitates as feathery, yellow crystals. The resulting mixture is cooled, poured into ice water and neutralized with 50% aqueous sodium hydroxide. The solid is collected, washed with water, and dried in vacuo to give 7.84 g. (87.3%) of crude product. This product is recrystallized from ethyl acetate to yield 7-benzoyl-5-nitroindoline, melting point 223–224° C.

*Analysis.*—Calcd. for $C_{15}H_{12}N_2O_3$ (percent): C, 67.15; H, 4.51; N, 10.44. Found (percent): C, 66.65; H, 4.39; N, 10.25.

(K) *7-benzoyl-1-(bromoacetyl)-5-nitroindoline*

A stirred mixture of 4.51 g. (0.0168 mole) of 7-benzoyl-5-nitroindoline (Preparation J), 6.78 g. (0.0337 mole) of bromoacetyl bromide and 150 ml. of benzene is refluxed for 2.5 hours. During the reaction a slow stream of nitrogen is allowed to pass through the system to flush out the hydrogen bromide formed. The reaction mixture is cooled in an ice bath and diluted with 200 ml. of Skellysolve B hexanes. The solid product is collected by filtration and recrystallized from ethyl acetate to give 5.90 g. of crude product. This product is again recrystallized from ethyl acetate to give 7-benzoyl-1-(bromoacetyl)-5-nitroindoline, melting point 169–171° C.

*Analysis.*—Calcd. for $C_{17}H_{13}BrN_2O_4$ (percent): C, 52.46; H, 3.37; Br, 20.53; N, 7.20. Found (percent): C, 52.38; H, 3.36; Br, 20.46; N, 6.78.

(L) *1-acetyl-5-chloro-7-nitroindoline*

A stirred mixture of 66.9 g. (0.342 mole) of 1-acetyl-5-chloroindoline, 342 ml. of acetic anhydride and 136 ml. of acetic acid is cooled to 10–15° C. and treated during 15 minutes with a solution of 35.9 g. of fuming nitric acid in 34.2 ml. of acetic acid. The mixture is kept at 10–15° C. during the addition and for an additional 2 hours. It is then poured into cold water. The solid is collected by filtration, washed with water, dried and recrystallized from ethyl acetate to give two crops of crude product, 71.1 g., melting point 173.5–176° C., and 4.12 g., melting point 170–173.5° C. (91.4%). Recrystallization of this product from ethyl acetate yields 1-acetyl-5-chloro-7-nitroindoline, melting point 174–175° C.

*Analysis.*—Calcd. For $C_{10}H_9ClN_2O_3$ (percent): C, 49.91; H, 3.77; N, 11.64; Cl, 14.74. Found (percent): C, 50.22; H, 4.07; N, 11.61; Cl, 14.75.

Using the procedure described in Preparation L, but replacing 1-acetyl-5-chloroindoline by the appropriately substituted 1-acetylindoline is productive of the corresponding 1-acetyl-7-nitroindoline. Representative of the 1-acetyl-7-nitroindolines so obtained are:

1-acetyl-5-fluoro-7-nitroindoline
1-acetyl-5-methyl-7-nitroindoline
1-acetyl-5-ethyl-7-nitroindoline
1-acetyl-5-propyl-7-nitroindoline
1-acetyl-5-isopropyl-7-nitroindoline
1-acetyl-5-methoxy-7-nitroindoline
1-acetyl-5-ethoxy-7-nitroindoline
1-acetyl-5-propoxy-7-nitroindoline
1-acetyl-5-isopropoxy-6-nitroindoline and
1-acetyl-5-bromo-7-nitroindoline.

(M) *5-chloro-7-nitroindoline*

A stirred mixture of 3.62 g. (0.015 mole) of 1-acetyl-5-chloro-7-nitroindoline (Preparation L), 50 ml. of 6 N hydrochloric acid and 100 ml. of ethanol is refluxed under nitrogen for 2 hours, and allowed to stand at ambient temperature for 18 hours. The reaction mixture which contains crystalline product is poured into water. The solid is collected by filtration, washed with water, dried and recrystallized from ethyl acetate to give 2.67 g. (89.7%) of product. This product is recrystallized again from ethyl acetate to give 5 chloro-7-nitroindoline, melting point 125–126° C.

*Analysis.*—Calcd. for $C_8H_7ClN_2O_2$ (percent: C, 48.37; H, 3.55; N, 14.11; Cl, 17.85. Found (percent): C, 48.42; H, 3.67; N, 14.19; Cl, 18.02.

Using the procedure described in Preparation M, but replacing 1-acetyl-5-chloro-7-nitroindoline by the appropriately substituted 1-acetyl-7-nitroindoline is productive of the corresponding 7-nitroindoline. Representative of the 7-nitroindolines so obtained are:

5-bromo-7-nitroindoline
5-methyl-7-nitroindoline
5-ethyl-7-nitroindoline
5-propyl-7-nitroindoline
5-isopropyl-7-nitroindoline
5-methoxy-7-nitroindoline
5-ethoxy-7-nitroindoline
5-propoxy-7-nitroindoline and
5-isopropoxy-7-nitroindoline.

(N) *7-amino-5-chloroindoline and hydrochloride thereof*

A stirred mixture of 19.9 g. (0.10 mole) of 5-chloro-7-nitroindoline (Preparation M), 52 ml. of 95% ethanol and 8 ml. of 20% aqueous sodium hydroxide is warmed under nitrogen to the reflux temperature and treated, portionwise, with 26 g. of zinc dust at such a rate that the mixture refluxes without external heating. At the end of the addition, the mixture has changed from the red to light yellow. Additional ethanol (13 ml.) is added and the mixture is refluxed for 1 hour, cooled and filtered. The solid is washed with ether. The combined filtrate and washing is treated with 1 g. of sodium hydrosulfite and concentrated in vacuo. A suspension of the residue in water is extracted with ether. The extract is washed with a saturated solution of sodium chloride, dried over anhydrous potassium carbonate and concentrated in vacuo to yield 7-amino-5-chloroindoline as a residue.

A solution of the residue in ethanol is cooled in an ice bath and acidified with methanolic hydrogen chloride. The resulting crystalline solid is collected by filtration and washed with ethanol. A small amount of additional product is obtained by concentrating the filtrate. The combined product is recrystallized to give 10.6 g., melting point 222° C. (dec.), and 0.849 g., melting point 219.5–221° C. (dec.), of product. Recrystallization of this product from ethanol yields 7-amino-5-chloroindoline hydrochloride, melting point 218.5–220° C. (dec.).

*Analysis.*—Calcd. for $C_8H_9ClN_2 \cdot HCl$ (percent): C, 46.85; H, 4.91; Cl, 34.58; N, 13.66. Found (percent): C, 46.85; H, 4.88; Cl, 34.80; N, 13.51.

Using the procedure described in Preparation N, but replacing 5-chloro-7-nitroindoline by the appropriately substituted 7-nitroindoline is productive of the corresponding 7-aminoindoline. Representative of the 7-aminoindolines so obtained are:

7-amino-5-bromoindoline
7-amino-5-fluoroindoline
7-amino-5-methylindoline
7-amino-5-ethylindoline
7-amino-5-propylindoline
7-amino-5-isopropylindoline
7-amino-5-methoxyindoline
7-amino-5-ethoxyindoline
7-amino-5-proxyindoline and
7-amino-5-isopropoxyindoline.

EXAMPLE 1

*1,2-dihydro-7-phenylpyrrolo[3,1,1-jk][1,4]benzodiazepin-(5H)-one*

A solution of 1.0 g. (0.00299 mole) of 1-(bromoacetyl)-7-benzoylindoline (Preparation D) in 100 ml. of tetrahydrofuran is mixed with 36 ml. of a 13% solution of ammonia in methanol, and the resulting solution is stirred at room temperature, under nitrogen, for 19 hours. It is then concentrated under reduced pressure at 25° C. The residue is mixed with water and extracted with methylene chloride. The extract is dried over anhydrous potassium carbonate and concentrated. Crystallization of the resulting product from ethyl acetate-Skellysolve B hexanes gives 0.63 g. of crude product. This product is recrystallized from ethyl acetate-Skellysolve B hexanes to give 1,2-dihydro-7-phenylpyrrolo[3,2,1-jk][1,4]benzodiazepin-4(5H)-one, melting point 140–151.° C.

*Analysis.* Calcd. for $C_{17}H_{14}N_2O$ (percent): C. 77.84; H, 5.38; N, 10.68. Found (percent): C, 77.90; H, 5.29; N, 10.83.

Using the procedure described in Example 1, but replacing 1-(bromoacetyl)-7-benzoylindoline by the appropriately substituted 1-(bromoacetyl)-7-benzoylindoline is productive of the correspondingly substituted 1,2-dihydro - 7-phenylpyrrolo[3,2,1-jk][1,4]benzodiazepin-4 (5H)-one. Representative of the 1,2-dihydro-7-phenyl-pyrrolo[3,2,1 - jk][1,4]benzodiazepin - 4(5H) - ones so obtained are:

1,2-dihydro-8-methyl-
1,2-dihydro-9-methyl-
1,2-dihydro-10-methyl-
1,2-dihydro-9-ethyl-
1,2-dihydro-9-propyl-
1,2-dihydro-9-isopropyl-
1,2-dihydro-8-methoxy-
1,2-dihydro-9-methoxy-
1,2-dihydro-10-methoxy-
1,2-dihydro-9-ethoxy-
1,2-dihydro-9-propoxy- and
1,2 - dihydro - 9 - isopropoxy - 7-phenylpyrrolo[3,2,1-jk][1,4]benzodiazepin-4(5H)-ones.

EXAMPLE 2

*9-chloro-1,2-dihydro-7-phenylpyrrolo[3,2,1-jk][1,4]benzodiazepin-4(5H)-one*

A solution of 13.5 g. (0.0357 mole) of 7-benzoyl-1-(bromoacetyl)-5-chloroindoline (Preparation H) in 525 ml. of tetrahydrofuran is treated with 450 ml. of methanol that has been saturated at room temperature with anhydrous ammonia. This solution is stirred, under nitrogen, at room temperature for 18 hours and concentrated under reduced pressure at 20–25° C. The residue is suspended in water and extracted several times wih methylene chloride. The extract is dried over anhydrous potassium carbonate and concentrated under reduced pressure. Crystallization of the residue from ethyl acetate-Skellysolve B hexanes gives 6.32 g. of a first crop of product and 2.37 g. of a second crop. Recrystallization of this product from ethyl acetate-Skellysolve B hexanes yields 9-chloro - 1,2 - dihydro-7-phenylpyrrolo[3.2,1-jk] [1,4]benzodiazepin-4(5H)-one, melting point 116–117.5° C.

Analysis.—Calcd. for $C_{17}H_{13}ClN_2O$ (percent): C, 68.80; H, 4.41; Cl, 11.95; N, 9.44. Found (percent): C, 68.98; H, 4.50; Cl, 11.94; N, 9.24.

Using the procedure described in Example 2, but replacing 7 - benzoyl-1-(bromoacetyl)-5-chloroinoline with the appropriate 7-benzoyl-1-(bromoacetyl)-haloindoline is productive of the corresponding 1,2-dihydro-halo-7-phenylpyrrolo[3,2,1-jk][1,4]benzodiazepin-4(5H)-one. Representative of the benzodiazepin-4(5H)-ones so obtained are:

8-chloro-1,2-dihydro-7-phenylpyrrolo-
10-chloro-1,2-dihydro-7-phenylpyrrolo-
8-bromo-1,2-dihydro-7-phenylpyrrolo-
9-bromo-1,2-dihydro-7-phenylpyrrolo-
10-bromo-1,2-dihydro-7-phenylpyrrolo-
8-fluoro-1,2-dihydro-7-phenylpyrrolo-
9-fluoro-1,2-dihydro-7-phenylpyrrolo- and
10-fluoro-1,2-dihydro-7-phenylpyrrolo[3,2,1-jk][1,4] benzodiazepin-4(5H)-ones.

EXAMPLE 3

1,2-dihydro-9-nitro-7-phenylpyrrolo[3,2,1-jk] [1,4]-benzodiazepin-4(5H)-one

A stirred suspension of 3.89 g. (0.01 mole) of 7-benzoyl-1-(bromoacetyl)-5-nitroindoline (Preparation K) in 150 ml. of dry tetrahydrofuran is cooled in an ice bath and treated with a saturated (room temperature) solution of anhydrous ammonia in 125 ml. of methanol. The resulting mixture is allowed to warm to room temperature and stand under nitrogen for 18 hours. It is then concentrated under reduced pressure at 20–25° C. The residue is suspended in a mixture of water and methylene chloride and filtered. The aqueous layer of the filtrate is extracted with methylene chloride. The combined methylene chloride solution is washed with water, dried over anhydrous magnesium sulfate and concentrated. The residue is chromatographed on 200 g. of silica gel with 50% ethyl acetate-50% cyclohexane (by volume); 50-ml. fractions are collected. The material eluted from the column in fractions 35–63 is crystallized from ethyl acetate-Skellysolve B hexanes to give 0.199 g. of melting point 157.5–160° C., and 0.067 g., melting point 157–158.5° C., of product. The two crops of product are combined and recrystallized from ethyl acetate-Skellysolve B hexanes to give 1,2-dihydro-9-nitro - 7 - phenylpyrrolo[3,2,1-jk][1,4]benzodiazepin-4(5H)-one, melting point 157–158.5° C.

Analysis.—Calcd. for $C_{17}H_{13}N_3O_3$ (percent): C, 66.44; H, 4.26; N, 13.68. Found (percent): C, 66.53; H, 4.55; N, 13.63.

EXAMPLE 4

1,2-dihydro-9-nitro-7-phenylpyrrolo[3,2,1-jk] [1,4]-benzodiazepin-4(5H)-one

A stirred mixture of 5.18 g. (0.0194 mole) of 7-benzoyl-5-nitroindoline (Preparation J), 5.40 g. (0.0387 mole) of ethyl glycinate hydrochloride and 40 ml. of pyridine is refluxed under nitrogen for 24 hours. During the first 6 hours a pyridine-water-ethanol azeotrope (50 ml.) is slowly distilled from the reaction mixture and replaced with fresh dry pyridine. The cooled reaction mixture is concentrated under reduced pressure. A little toluene is added to the residue, and the resulting mixture is again concentrated. This residue is suspended in cold water, made ammoniacal and extracted with methylene chloride. The extract is washed with water, dried over anhydrous potassium carbonate, treated with 35 g. of silica gel and concentrated under reduced pressure. The residue is poured onto a column of silica gel (250 g.) which has been prepared with 60% ethyl acetate-40% cyclohexane (by volume). The column is then eluted with 60% ethyl acetate-40% cyclohexane; 40-ml. fractions are collected. The material eluted in fractions 28 to the end contains the product. The product is crystallized from ethyl acetate-Skellysolve B hexanes in two crops; 2.82 g., melting point 160–163.5° C. and the other 0.258 g., melting point 159.5–162.5° C. (51.5% yield) of 1,2-dihydro-9-nitro-7-phenylpyrrolo[3,2,1-jk][1,4]benzodiazepin - 4(5H) - one which has a NMR spectran identical to the product obtained in Example 3.

EXAMPLE 5

6,7 - dihydro - 7 - phenylpyrrolo[3,2,1-jk][1,4]benzodiazepin-4(5H) - one and 7 - phenylpyrrolo[3,2,1-jk][1,4] benzodiazepin-4(5H)-one (a) Mixture of 6,7-dihydro-7-phenylpyrrolo[3,2,1-jk]-[1,4]benzodiazepin - 4(5H)-one and 7 - phenylpyrrolo-[3,2,1 - jk][1,4]benzodiazepin - 4(5H)-one.— Water is removed from a mixture of 10% palladium-on-carbon catalyst (2.6 g.) and decalin (100 ml.) by distillation. The resulting mixture is cooled, treated with 5.24 g. (0.02 mole) of 1,2-dihydro - 7 - phenylpyrrolo[3,2,1-jk][1,4] benzodiazepin-4(5H)-one (Example 1), refluxed under nitrogen for 1.5 hours, cooled and filtered. The solid is washed with about 50 ml. of ethyl acetate and the ethyl acetate solution is concentrated to dryness. The residue is combined with the decalin filtrate and poured onto a silica gel (400 g.) column which has been prepared with cyclohexane. The material is washed onto the column with cyclohexane and the column is eluted with 15% ethyl acetate-85% cyclohexane (by volume) (fractions 1–60) and ethyl acetate (fractions 61–82); 75-ml. fractions are collected.

(b) 7 - phenylpyrrolo[3,2,1 - jk][1,4]benzodiazepin-4 (5H)-one.—The material eluated in fractions 23–33 is crystallized from ethyl acetate-Skellysolve B hexanes to give 0.714 g. of product, melting point 149.5–150.5° C. This product is recrystallized from ethyl acetate-Skellysolve B hexanes to yield 7-phenylpyrrolo[3,2,1-jk][1,4] benzodiazepin-4(5H)-one, melting point 151.5–152° C.

Analysis.—Calcd. for $C_{17}H_{12}N_2O$ (percent): C, 78.44; H, 4.65; N, 10.76. Found (percent): C, 78.77; H, 4.96; N, 10.62.

Using the procedure described in Example 5(a and b), but replacing 1,2 - dihydro-7-phenylpyrrolo[3,2,1-jk] [1,4]benzodiazepin-4(5H)-one by the appropriately substituted, 1,2-dihydro-7-phenylpyrrolo[3,2,1-jk][1,4]benzodiazepin-4(5H)-ones is productive of the corresponding 7 - phenylpyrrolo[3,2,1-jk][1,4] - benzodiazepin-4(5H)-ones. Representative of the 7 - phenylpyrrolo[3,2,1-jk] [1,4]benzodiazepin-4(5H)-ones so obtained are:

9-methyl-7-phenylpyrrolo-
9-ethyl-7-phenylpyrrolo-
7-phenyl-9-propylpyrrolo-
9-isopropyl-7-phenylpyrrolo-
9-methoxy-7-phenylpyrrolo-
9-ethovy-7-phenylpyrrolo-
8-methyl-7-phenylpyrrolo-
8-methoxy-7-phenylpyrrolo-
10-methyl-7-phenylpyrrolo- and
10-methoxy-7-phenylpyrrolo[3,2,1-jk][1,4]benzodiazepin-4(5H)-ones..

(c) 6,7 - dihydro - 7 - phenylpyrrolo[3,2,1-jk][1,4] benzodiazepin-4(5H)-one.—The material eluted in fractions 36–38 is crystallized from ethyl acetate-Skellysolve B hexanes to give 1.00 g., melting point 114–116° C. and 0.246 g., melting point 112.5–114° C. of product. Recrystallization of this product from ethyl acetate- Skellysolve B hexanes give 6,7-dihydro-7-phenylpyrrolo [3,2,1 - jk][1,4]benzodiazepin-4(5H)-one, melting point 115–117° C.

*Analysis.*—Calcd. for $C_{17}H_{14}N_2O$ (percent): C, 77.84; H, 5.38; N, 10.68. Found (percent): C, 77.60; H, 5.31; N, 10.47.

Using the procedure described in Example 5(a and c), but replacing 1,2 - dihydro - 7 - phenylpyrrolo[3,2,1 - jk] [1,4]benzodiazepin-4(5H)-one by the appropriately substituted 1,2-dihydro - 7 - phenylpyrrolo[3,2,1 - jk][1,4] benzodiazepin-4(5H)-ones is productive of the corresponding 6,7 - dihydro - 7 - phenylpyrrolo[3,2,1-jk][1,4] benzodiazepin-4(5H)-ones. Representative of the 6,7-dihydro - 7 - phenylpyrrolo[3,2,1-jk][1,4]benzodiazepin-4(5H)-ones so obtained are:

6,7-dihydro-9-methyl-7-phenylpyrrolo-
6,7-dihydro-9-ethyl-7-phenylpyrrolo-
6,7-dihydro-7-phenyl-9-propylpyrrolo-
6,7-dihydro-9-isopropyl-7-phenylpyrrolo-
6,7-dihydro-9-methoxy-7-phenylpyrrolo-
6,7-dihydro-9-ethoxy-7-phenylpyrrolo
6,7-dihydro-8-methyl-7-phenylpyrrolo-
6,7-dihydro-10-methyl-7-phenylpyrrolo-
6,7-dihydro-8-methoxy-7-phenylpyrrolo- and
6,7 - dihydro - 10 - methoxy - 7 - phenylpyrrolo[3,2,1-jk][1,4-benzodiazepin-4(5H)-ones.

EXAMPLE 6

*9 - chloro - 1,2 - dihydro-6-phenylpyrrolo[1,2,3-ef][1,5] benzodiazepin - 4(5H) - one and 9-chloro-1,2-dihydro-4 - phenylpyrrolo[1,2,3 - ef][1,5]benzodiazepin-6(7H) one*

(a) Mixture of 9-chloro - 1,2-dihydro-6-phenylpyrrolo- [1,2,3-ef][1,5]benzodiazepin - 4(5H) - one an 9-chloro-1,2 - dihydro - 4 - phenylpyrrolo[1,2,3-ef][1,5]benzodiazepin-6(7H)-one.—A solution of 2.05 g. (0.01 mole) of 7-amino-5-chloro-indoline hydrochloride (Preparation N) in cold water is made alkaline with sodium hydroxide and extracted with ether. The extract is washed with brine, dried over anhydrous sodium carbonate and concentrated in vacuo. A solution of the residue in xylene (20 ml.) is heated to the reflux temperature, under nitrogen, and treated during 26 minutes with a solution of ethyl benzoylacetate (1.92 g.; 0.01 mole) in xylene (10 ml.). During the addition and for an additional 36 minutes ethanol and water formed in the reaction are distilled from the mixture; the volume is kept constant by the addition of fresh xylene (9.5 ml.). The mixture is cooled and diluted with Skellysolve B hexane. The solid product is collected by filtration, washed with Skellysolve B hexanes and extracted with ether.

(b) 9 - chloro - 1,2-dihydro - 4 - phenylpyrrolo[1,2,3-ef][1,5]-benzodiazepin-6(7H)-one. The solid remaining after the ether extraction [Example 6(a)] is dissolved in methylene chloride-methanol, decolorized with decolorizing carbon and crystallized to give 0.299 g. melting point 279–282° C., and 0.043 g., melting point 277–281° C. (11.5% yield) of product. Recrystallization of this product from methylene chloride gives 9-chloro-1,2-dihydro - 4 - phenylpyrrolo[1,2,3-ef][1,5]benzodiazepin-6(7H)-one, melting point 280–281° C.

*Analysis.*—Calcd. for $C_{17}H_{13}ClN_2O$ (percent): C, 68.80; H, 4.41; Cl, 11.95; N, 9.44. Found (percent): C, 69.14; H, 4.89; Cl, 12.06; N, 8.95.

Using the procedure of Example 6 (a and b), but replacing 7-amino-5-chloroindoline hydrochloride by the appropriately substituted 7-aminoindoline hydrochlorides is productive of the corresponding 1,2-dihydro-4-phenylpyrrolo[1,2,3-ef][1,5]benzodiazepin - 6(7H) - ones. Representatives of the 1,2-dihydro-4-phenylpyrrolo[1,2,3-ef] [1,5]benzodiazepin-6(7H)-ones so obtained are:

1,2-dihydro-4-phenylpyrrolo-
9-bromo-1,2-dihydro-4-phenylpyrrolo-
9-fluoro-1,2-dihydro-4-phenylpyrrolo-
9-methyl-1,2-dihydro-4-phenylpyrrolo-
9-ethyl-1,2-dihydro-4-phenylpyrrolo
9-propyl-1,2-dihydro-4-phenylpyrrolo-
9-methoxy-1,2-dihydro-4-phenylpyrrolo-
9-ethoxy-1,2-dihydro-4-phenylpyrrolo, and
9-propoxy-1,2-dihydro-4-phenylpyrrolo[1,2,3-ef] [1,5]benzodiazepin-6(7H)-ones.

(c) 9-chloro-1,2-dihydro - 6 - phenylpyrrolo[1,2,3-ef] [1,5]benzodiazepin-4(5H)-one.—The ether extract from Example 6(a) is decolorized with decolorizing carbon and crystallized to give 1.31 g. (44.3%) of product, melting point 123–126° C. This product is recrystallized from ether to yield 9-chloro-1,2-dihydro-6-phenylpyrrolo-[1,2, 3-ef][1,5]benzodiazepin-4(5H)-one, melting point 124.5–125.5° C.

*Analysis.*—Calcd. for $C_{17}H_{13}ClN_2O$ (percent): C, 68.80; H, 4.41; Cl, 11.95; N, 9.44. Found (percent): C, 69.02; H, 4.64; Cl, 12.14; N, 9.44.

Using the procedure of Example 6 (a and c), but replacing 7-amino-5-chloroindoline hydrochloride by the appropriately substituted 7-aminoindoline hydrochlorides is productive of the corresponding 1,2-dihydro-6-phenylpyrrolo[1,2,3-ef][1,5]benzodiazepin - 4(5H) - ones. Representative of the 1,2-dihydro-6-phenylpyrrolo[1,2,3-ef] [1,5]benzodiazepin-4(5H)-ones so obtained are:

1,2-dihydro-6-phenylpyrrolo-
9-bromo-1,2-dihydro-6-phenylpyrrolo-
9-fluoro-1,2-dihydro-6-phenylpyrrolo-
9-methyl-1,2-dihydro-6-phenylpyrrolo-
9-ethyl-1,2-dihydro-6-phenylpyrrolo-
9-propyl-1,2-dihydro-6-phenylpyrrolo-
9-methoxy-1,2-dihydro-6-phenylpyrrolo-
9-ethoxy-1,2-dihydro-6-phenylpyrrolo, and
9-propoxy-1,2-dihydro-6-phenylpyrrolo[1,2,3-ef] [1,5]benzodiazepin-4(5H)-ones.

EXAMPLE 7

*9-chloro-1,2,-dihydro-4-phenylpyrrolo[1,2,3-ef][1,5] benzodiazepin-6(7H)-one perchlorate*

A suspension of 2.0 g. of 9-chloro-1,2-dihydro-4-phenylpyrrolo[1,2,3-ef][1,5]benzodiazepin - 6(7H) - one [Example 6(b)] in about 25 ml. of ether and 3 ml. of 70% perchloric acid is stirred for 2 hours. The solid is collected by filtration, washed with ether and dried to give 2.47 g. of crude product, melting point 263–267° C. (dec.). This product is recrystallized from methanol-ethyl acetate to give 9-chloro-1,2-dihydro-4-phenylpyrrolo [1,2,3 - ef][1,5]benzodiazepin - 6(7H) - one perchlorate, melting point 270° C.

*Analysis.*—Calcd. for $C_{17}H_{13}ClN_2O \cdot HClO_4$ (percent): C, 51.40; H, 3.55; Cl, 17.85; N, 7.05. Found (percent): C, 51.23; H, 3.54; Cl, 18.05; N, 6.88

Using the procedure of Example 7, but replacing 9-chloro - 1,2 - dihydro - 4 - phenylpyrrolo[1,2,3 - ef][1,5] benzodiazepin-6(7H)-one by the appropriately substituted 1,2 - dihydro - 4 - phenylpyrrolo[1,2,3-ef][1,5]benzodiazepin-6(7H)-ones is productive of the corresponding 1,2-dihydro-4-phenylpyrrolo[1,2,3 - ef][1,5]benzodiazepin - 6 (7H)-one perchlorates. Representative of the perchlorates so obtained are the perchlorates of the 1,2-dihydro-4-phenylpyrrolo[1,2,3-ef][1,5]benzodiazepin-6(7H) - ones set forth in Example 6(b).

EXAMPLE 8

*9-chloro-4-phenyl-1,2,4,5-tetrahydropyrrolo[1,2,3-ef] [1,5]benzodiazepin-6(7H)-one*

A stirred mixture of 2.5 g. of sodium borohydride in absolute ethanol is cooled in an ice bath and treated, portion-wise, with 2.51 g. of 9-chloro-1,2-dihydro-4-phenyl-pyrrolo[1,2,3-ef][1,5]benzodiazepin - 6(7H) - one perchlorate (Example 7). The mixture is allowed to warm slowly to ambient temperature and stand for 22 hours under nitrogen. It is then concentrated in vacuo. The residue is mixed with water, stirred in an ice bath for a few minutes and filtered. The solid is washed with water, dried and recrystallized from ethyl acetate to give 1.24 g. (65.6%) of a mixture of polymorphs of the desired product, melting point 153.5–193.5° C. Recrystallizing the mixture from ethyl acetate yields the higher melting polymorph of 9-chloro-4-phenyl-1,2,4,-tetrahydropyrrolo[1,2,3-ef][1,5]benzodiazepin-6(7H)-one, melting point 183–187° C.

*Analysis.*—Calcd. for $C_{17}H_{15}ClN_2O$ (percent): C, 68.34; H, 5.06; Cl, 11.87; N, 9.38. Found (percent): C, 68.26; H, 5.10; Cl, 11.79; N, 8.98.

Using the procedure described in Example 8, but replacing 9-chloro-1,2-dihydro - 4 - phenylpyrrolo[1,2,3-ef][1,5]benzodiazepin-6(7H)-one perchlorate by the appropriately substituted 1,2-dihydro-4-phenylpyrrolo[1,2,3-ef][1,5]benzodiazepin-6(7H)-one perchlorates is productive of the corresponding 4-phenyl-1,2,4,5-tetrahydropyrrolo[1,2,3-ef][1,5]benzodiazepin-6(7H)-ones. Representative of the 4-phenyl-1,2,3,4-tetrahydropyrrolo[1,2,3-ef][1,5]benzodiazepin-6(7H)-ones so obtained are:

4-phenyl-1,2,4,5-tetrahydropyrrolo-
9-bromo-4-phenyl-1,2,4,5-tetrahydropyrrolo-
9-fluoro-4-phenyl-1,2,4,5-tetrahydropyrrolo-
9-methyl-4-phenyl-1,2,4,5-tetrahydropyrrolo-
9-ethyl-4-phenyl-1,2,4,5-tetrahydropyrrolo-
9-propyl-4-phenyl-1,2,4,5-tetrahydropyrrolo-
9-methoxy-4-phenyl-1,2,4,5-tetrahydropyrrolo-
9-ethoxy-4-phenyl-1,2,4,5-tetrahydropyrrolo, and
9-propoxy-4-phenyl-1,2,4,5-tetrahydropyrrolo[1,2,3-ef][1,5]benzodiazepin-6(7H)-ones.

I claim:

1. A compound selected from the group consisting of (a) compounds having the formulae:

wherein R is selected from the group consisting or hydrogen, alkyl of from 1 to 3 carbon atoms, inclusive, alkoxy of from 1 to 3 carbon atoms, inclusive, bromo, chloro and fluoro; and $R_1$ is selected from the group consisting of hydrogen, alkyl of from 1 to 3 carbon atoms, inclusive, and alkoxy of from 1 to 3 carbon atoms, inclusive; and (b) the addition salts with pharmacologically acceptable acids of the compounds having the above formulae.

2. A compound of claim 1 selected from the group consisting of Formulae I and I'.
3. A compound of claim 2 having the formula of I.
4. A compound of claim 3 wherein R is hydrogen.
5. A compound of claim 3 wherein R is 9-chloro.
6. A compound of claim 2 having the formula of I'.
7. A compound of claim 1 selected from the group consisting of Formulae II and III.
8. A compound of claim 7 having the formula of II.
9. A compound of claim 8 wherein $R_1$ is hydrogen.
10. A compound of claim 7 having the formula of III.
11. A compound of claim 10 wherein $R_1$ is hydrogen.
12. A compound of claim 1 selected from the group consisting of Formulae IV, V and VI.
13. A compound of claim 12 having the formula of IV.
14. A compound of claim 13 wherein R is chloro.
15. A compound of claim 12 having the formula of V.
16. A compound of claim 15 wherein R is chloro.
17. The perchlorate of the compound of claim 16.
18. A compound of claim 12 having the formula of VI.
19. A compound of claim 18 wherein R is chloro.
20. A process for preparing a compound having the formula:

wherein R is selected from the group consisting of hydrogen, alkyl of from 1 to 3 carbon atoms, inclusive, alkoxy of from 1 to 3 carbon atoms, inclusive, bromo, chloro and fluoro, which comprises heating a compound having the formula:

wherein R is the same as above with ethyl glycinate hydrochloride in pyridine.

21. A process for preparing a compound having the formula:

wherein R is selected from the group consisting of hydrogen, alkyl of from 1 to 3 carbon atoms, inclusive, alkoxy of from 1 to 3 carbon atoms, inclusive, bromo, chloro and fluoro, which comprises (a) treating a compound having the formula:
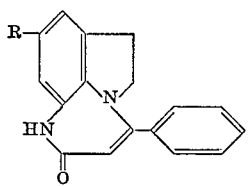
wherein R is the same as above, with aqueous perchloric acid and
(b) reacting the product of (a) with a mixture of sodium borohydride in ethanol.
References Cited
UNITED STATES PATENTS
3,314,942   4/1967   Hester _____ 260—239.3
HENRY R. JILES, Primary Examiner
R. T. BOND, Assistant Examiner
U.S. Cl. X.R.
260—326.11; 424—274